May 3, 1927.
G. DOD
1,627,018
ROPE OR BELT DRIVE FOR DRYING CYLINDERS AND THE LIKE
Filed Sept. 28, 1925  4 Sheets-Sheet 1
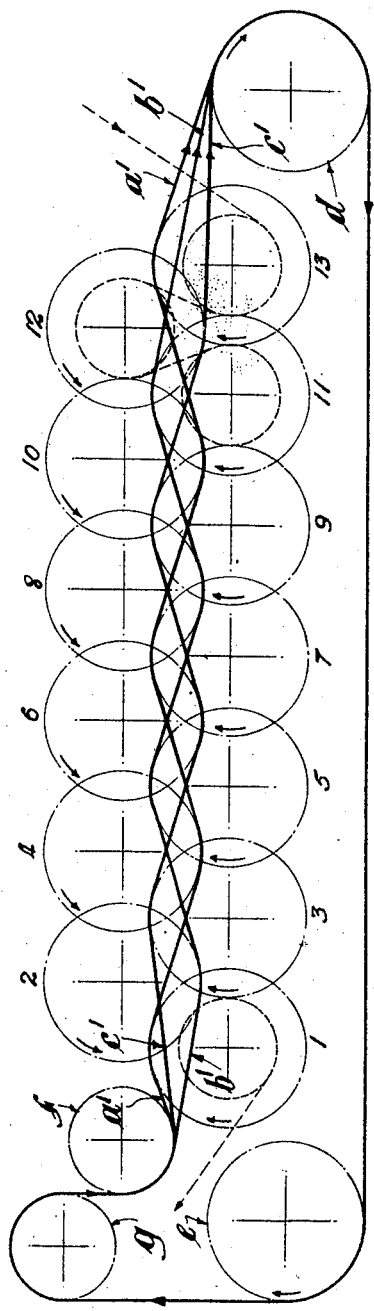
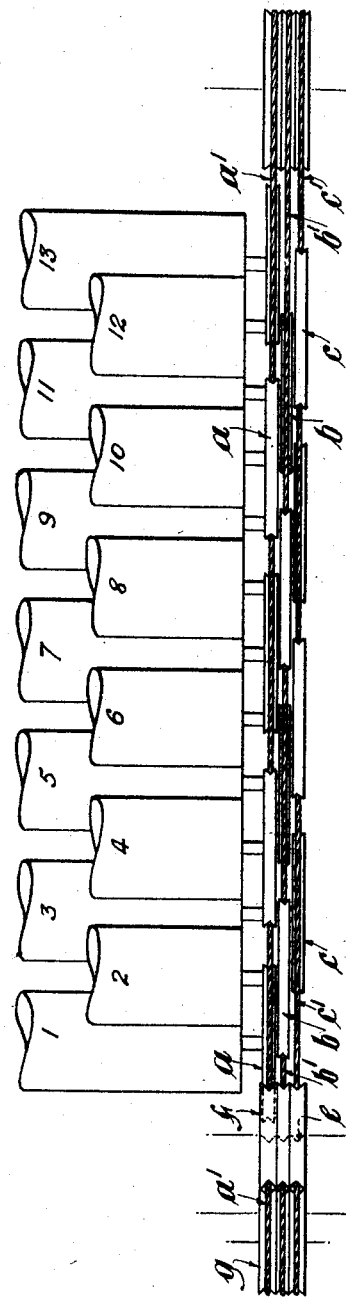
Inventor:
Gerald Dod.
By his Attorney: Walker Gunn May 3, 1927. 1,627,018
G. DOD
ROPE OR BELT DRIVE FOR DRYING CYLINDERS AND THE LIKE
Filed Sept. 28, 1925 4 Sheets-Sheet 2

Inventor:-
Gerald Dod.
By his Attorney:- Walter Gunn

May 3, 1927.

G. DOD 1,627,018

ROPE OR BELT DRIVE FOR DRYING CYLINDERS AND THE LIKE

Filed Sept. 28, 1925    4 Sheets-Sheet 3

Inventor:-
Gerald Dod.
Walter Gunn

By his Attorney:

May 3, 1927.

G. DOD 1,627,018

ROPE OR BELT DRIVE FOR DRYING CYLINDERS AND THE LIKE

Filed Sept. 28, 1925  4 Sheets-Sheet 4

Inventor:-
Gerald Dod.
By his Attorney:- Walter Gunn

Patented May 3, 1927.

1,627,018

UNITED STATES PATENT OFFICE.

GERALD DOD, OF SOUTHPORT, ENGLAND.

ROPE OR BELT DRIVE FOR DRYING CYLINDERS AND THE LIKE.

Application filed September 28, 1925, Serial No. 59,239, and in Great Britain October 23, 1924.

This invention refers to a new or improved rope (or belt) drive for multi-cylinder drying machines and the like. In particular the invention has reference to drying machines, the cylinders of which are arranged in rows and lie close together, the axis of each cylinder of one row lying opposite the adjacent peripheries of two cylinders in the next row. The cylinders of such drying machines are usually driven through either cast iron spur wheels or bevel wheels and pinions, and the power required to drive a complete machine, especially a large machine comprising 30 to 40 cylinders, is considerable. This is partly due to the gears, which are seldom of true tooth form and rarely mesh accurately, and partly, if not chiefly, due to the power absorbed in overcoming the friction of the packing in the glands, which are tightly packed to prevent leakage of steam, etc., around the cylinder trunnions.

By the adoption of self-aligning doll-head bearings of the kind forming the subject of my Patent No. 1,425,635, granted August 15, 1922, using anti-friction balls or rollers, and with which the resistance to rotation of the cylinders is reduced to a minimum, a rope (or belt) drive can be successfully applied, with its attendant advantages of cleanliness, steady running and noiselessness.

In the known rope drive, the rope pulleys are of a slightly smaller diameter than the usual gear wheels, and there is a rope or ropes common to all the pulleys. After passing around the pulley of an upper cylinder, the rope or ropes pass around the pulley of the next lower cylinder, and from the pulley of such lower cylinder the rope or ropes pass around the pulley of the next upper cylinder, the rope or ropes thus wrapping around the pulley for a considerable portion of their peripheries, and thereby causing a considerable to and fro bending of the ropes as they travel forward, which bending, besides causing rapid deterioration of the ropes, results in extra power being absorbed. With the one rope or each rope passing around all the pulleys as described, the pulleys cannot be other than of a diameter less than that of the usual gear wheels. To merely thread the rope or ropes between the rows of pulleys and to rely on the small arc of contact to rotate the pulleys, with the pulleys limited in size and overlap, necessitates an excessive heavy tension and a consequent shortening of the life of the rope or ropes.

This invention has for its object to provide an arrangement of rope (or belt) drive whereby repeated sharp bending and excessive tension of the rope (or belt) are avoided, thus prolonging its life, and whereby the size of the rope pulleys can be varied within wide limits while with an increased size of pulley a greater rope speed is obtainable, with consequent higher efficiency.

According to the invention, a rope drive is employed wherein a plurality of ropes (or belts) are used and the machine is divided, for the purpose of the drive, into an odd number of not less than three "sections", the pulleys of each section lying out of the plane of those of each other section, and each section of pulleys having its own driving rope (or belt). Further, the pulleys of alternate sections are on alternate odd and even numbers of cylinders, and the pulleys of each intermediate section are on alternate even and odd numbers of consecutive cylinders. Usually, there will not be more than three or five sections of pulleys.

The invention may be applied to double row, or single row machines.

In the case of a double row machine the alternate pulleys of each section will be in one row and the intermediate pulleys of the same section will be in the other row.

Each rope is driven by a power shaft and pulley which may be common to all the other ropes, and each rope is fed to the machine by a further pulley, which also may be common to all the ropes. The return part of each rope is held in tension by a weighted guide pulley, which may be common to all the ropes.

By "consecutive" cylinders is meant the cylinders in the inverse order of contact followed by the material to be dried in passing through the machine. By a "section" of pulleys or cylinders is meant those pulleys or cylinders driven by the same rope.

Upon the accompanying drawing:—

Fig. 1 illustrates a side view, and

Fig. 2 a plan of one example of the improved multiple rope "drive" as applied to a drying machine having two horizontal rows of cylinders.

Fig. 3 illustrates a side view, and

Fig. 4 a plan of another example of the improved multiple rope "drive" as applied to the same type of machine.

In the example of drive shown in Figs. 1 and 2, only 13 cylinders are shown, 6 in the top row, and 7 in the bottom row. Usually there are a larger number of cylinders and in some cases as many as 30 to 40. The fabric or material to be dried, enters at the right hand end of the machine viewed from the side shown in Fig. 1, and the cylinders are rotated in the direction of the arrows, the fabric or material to be dried first passing around a cylinder in the bottom row and then around a cylinder in the top row. The cylinders are numbered 1 to 13 respectively. To each cylinder trunnion is applied a rope (or belt) pulley, and for the purpose of the drive the cylinders and pulleys are arranged in odd numbers of sections with the pulleys of each section in the same plane, but out of the plane of those of each other section. There will not be less than three sections, in order that the pulleys may be of a larger diameter than the distance between the axes of consecutive cylinders. And with the pulleys of the three sections applied to consecutive cylinders, the pulleys of the respective sections will be on alternate odd and even cylinders, or even and odd cylinders, according to the number of the section. A separate rope is provided for the pulleys of each section.

In Figs. 1 and 2, there are three sections of pulleys, and three ropes. The three sections of pulleys are marked $a$, $b$, $c$, see Fig. 2. The ropes are marked $a^1$, $b^1$, $c^1$. The three ropes are driven by a rope driving pulley $d$ common to all, and the return half of each rope passes around guide pulleys $e$, $f$ and over a tensioning pulley $g$, common to all the other ropes.

The pulleys of each section are of a diameter larger than the cylinders, in order that the upper row and lower row of cylinders shall "lap" with a line drawn centrally between the cylinder axes, see Fig. 1, and also in order that the desired drive of each section may be effected by the rope passing between the pulleys, instead of around said pulleys, the "lap" of the pulleys affording the required arc of contact for enabling the pulleys to be rotated without putting too great a strain on the rope.

The rope $a^1$ impinges against and drives the pulleys of cylinders 1, 4, 7, 10, 13. The rope $b^1$ impinges against and drives the pulleys of cylinders 2, 5, 8 and 11. The rope $c^1$ impinges against and drives the pulleys of cylinders 3, 6, 9 and 12.

Figure 3:
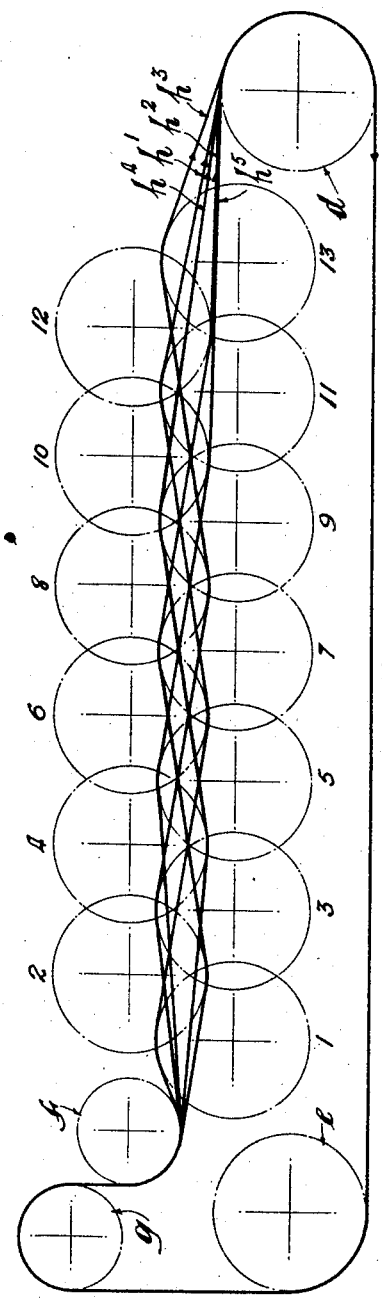
Figure 4:
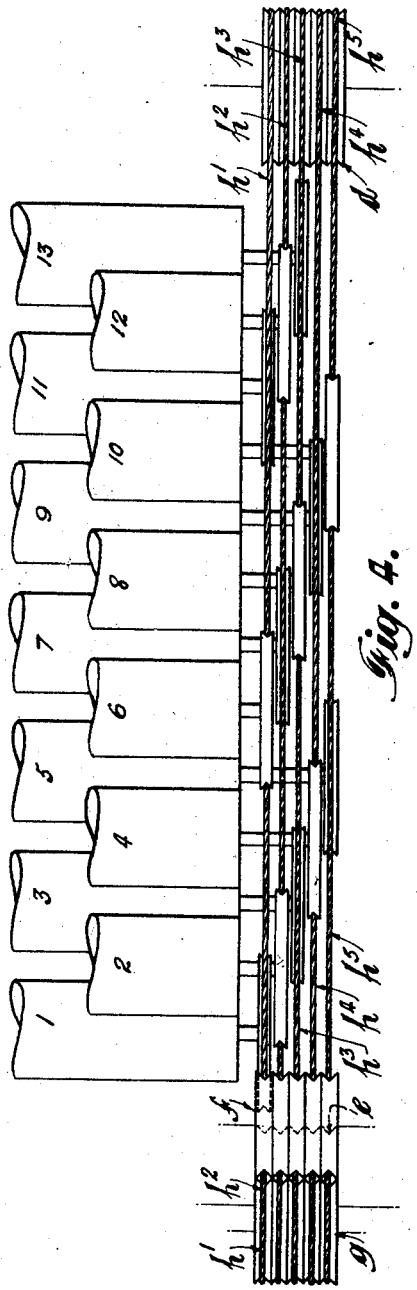

In Figs. 3 and 4 the drive is divided into five sections and there are five ropes, which are designated $h^1$, $h^2$, $h^3$, $h^4$, and $h^5$. The rope $h^1$ drives the pulleys of cylinders 1, 6 and 11; the rope $h^2$ drives the pulleys of cylinders 2, 7 and 12; the rope $h^3$ drives the pulleys of cylinders 3, 8 and 13; the rope $h^4$ drives the pulleys of cylinders 4 and 9, and the rope $h^5$ drives the pulleys of cylinders 5 and 10.

Figure 5:
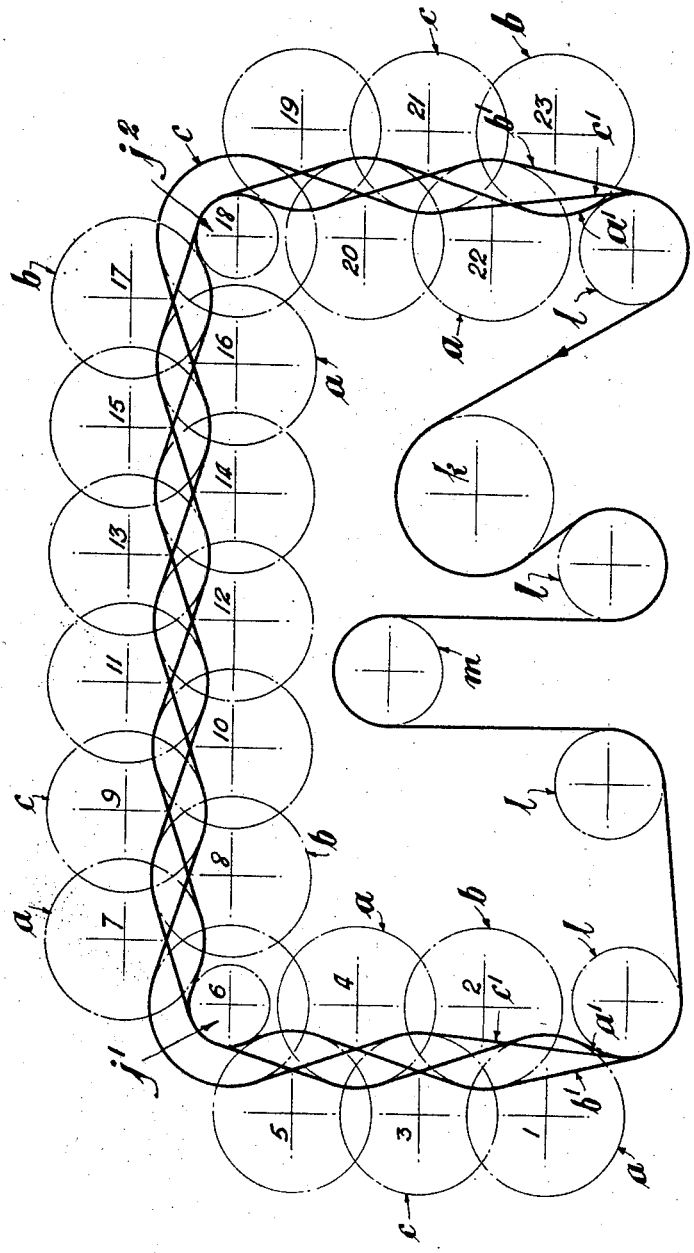
Fig. 5 illustrates the application of the invention to what is known as a combined vertical and horizontal type of multi-cylinder drying machine.

In Fig. 5, the "drive" is divided into three sections, and there are three ropes, idler pulleys $j^1$, $j^2$ being provided to allow for the ropes passing from the cylinders lying in vertical planes to the cylinders lying in horizontal planes, and vice versa. The idler pulleys are preferably rotatably mounted on the trunnions of the two end cylinders of the bottom horizontal row, and while one rope engages the pulleys of the end cylinders, the other two ropes engage the idler pulleys. The several ropes are driven by the power pulley $k$ (common to all) and are guided and tensioned by the pulleys $l$, $m$ respectively. The same letters of reference for the sections of pulleys and for the ropes used in respect to Figs. 1 and 2 are used in respect to Fig. 5.

Figure 6:
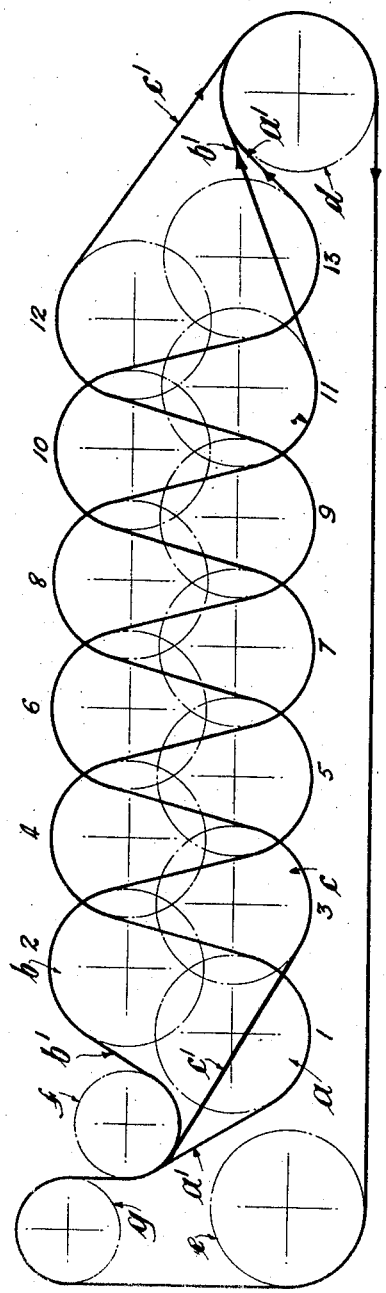
Figs. 6 and 7 illustrate further examples of the invention.

Although preferring to effect the drive by passing the rope of each section between the pulleys of the section, and to rely on the arc of contact of the rope produced by the "lap" of the pulleys, the drive may be effected by passing the rope of each section over and under the pulleys of the section, see Fig. 6. In this case, the material to be dried will pass through the machine from left to right, or in the same general direction as followed by the ropes.

Figure 7:
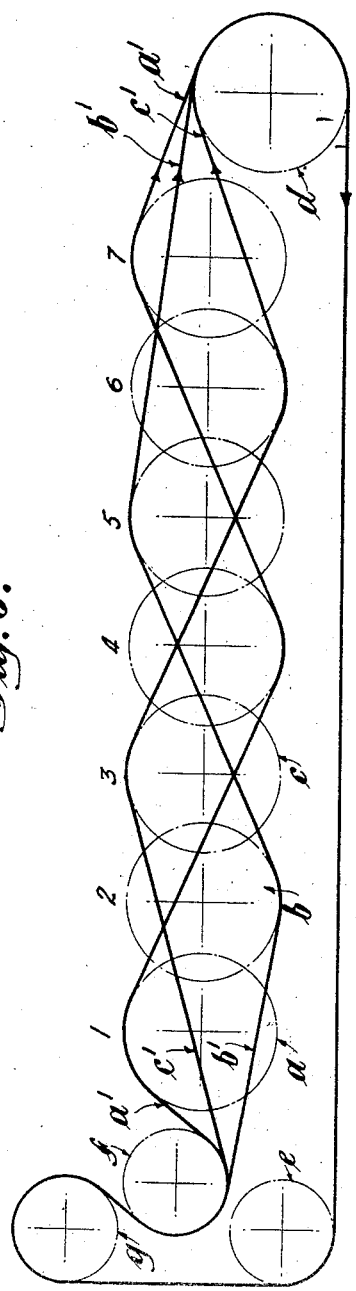

The invention may also be applied to multi-cylinder drying machines in which there is only a single row of cylinders and the consecutive cylinders rotate in opposite directions, see Fig. 7.

In each example it will be seen that the sections of pulleys are odd in number, and that the pulleys of alternate sections are alternately on odd and even numbers of consecutive cylinders and those of the intermediate section (or sections) are alternately on even and odd numbers of consecutive cylinders.

When one of the sections of the machine comprises only a few cylinders, and the other sections are relatively large, a rope and pulley for the small section may be dispensed with, and reliance be placed on the material to be dried to rotate the small section of cylinders.

The cylinder trunnions will preferably be supported in doll heads made according to my Patent No. 1,425,635, but it will be understood that they may be supported in any other and suitable doll heads or bearings.

Although preferring to drive the several ropes or all the sections by a power shaft and pulley common to all, they may be driven by more than one shaft and pulley, and even one for each rope or section.

By means of this invention the following advantages are obtainable, first, the size of the pulleys on the cylinders can be increased beyond that of the usual size of gear wheel or rope pulley, thus decreasing the pulling effort required on the rope; second, the speed of the rope is increased by using larger pulleys which further enables smaller diameter ropes being used to transmit the necessary driving effort, third; any excessive strain on the ropes is avoided by using larger pulleys and having separate ropes driving separate sections of the machine; fourth, the life-time of the ropes is considerably prolonged and should one rope break, it does not necessarily entail stopping the machine and production, as a section of the cylinders driven on my anti-friction doll heads has been found to be sufficient to keep the machine running, and fifth, a steady and silent drive is obtained, enabling the cylinders to be run at increased speeds without running the risk of damage to the fabrics being dried, either through dirt or oil being thrown, or by iron rust from small particles of metal as occurs when gear wheel drives are used, and the known injurious effect on the fabric resulting from the uneven motion of the gear teeth is eliminated.

What I claim is:—

1. In multi-cylinder drying machines, wherein the cylinders lie close together, and the material to be dried passes under and over consecutive cylinders, a pulley on the axis of each cylinder, each of the pulleys being of one size and of larger diameter than the distance between the axes of the said consecutive cylinders, and belts for driving the said pulleys and cylinders.

2. In multi-cylinder drying machines, wherein the cylinders lie close together, and the material to be dried passes under and over consecutive cylinders, sections of cylinders, pulleys on the axes of the cylinders, the pulleys of each section lying in the same plane, but out of the plane of those of each other section, all of such pulleys being of larger diameter than the distance between the axes of consecutive cylinders, and belts for driving the said pulleys and cylinders.

3. In multi-cylinder drying machines, having cylinders arranged close together, an odd number of not less than three sections of cylinders, pulleys on the axes of the cylinders, the pulleys of each section lying in the same plane, but out of the plane of each other section, the pulleys of alternate sections being mounted alternately on odd and even numbers of consecutive cylinders, and those of each intermediate section being mounted alternately on even and odd sections of consecutive cylinders, a belt for each section of pulleys and cylinders, and means for driving the several belts, as set forth.

4. In multi-cylinder drying machines, having cylinders arranged close together, an odd number of not less than three sections of cylinders, pulleys on the axes of the cylinders, of a diameter larger than the distance between the axes of consecutive cylinders, the pulleys of each section lying in the same plane, but out of the plane of each other section, the pulleys of alternate sections being mounted alternately on odd and even numbers of consecutive cylinders, and those of each intermediate section being mounted alternately on even and odd sections of consecutive cylinders, a belt for each section of pulleys and cylinders, and means for driving the several belts, as set forth.

5. In multi-cylinder drying machines having cylinders arranged close together, an odd number of not less than three sections of cylinders, pulleys on the axes of the cylinders, of a diameter larger than the distance between the axes of consecutive cylinders, the pulleys of each section lying in the same plane, but out of the plane of each other section, the pulleys of alternate sections being mounted alternately on odd and even numbers of consecutive cylinders, and those of each intermediate section being mounted alternately on even and odd sections of consecutive cylinders, a belt for each section of pulleys and cylinders, a power shaft, and a pulley thereon common to all the belts, and means for guiding and tensioning the belts, as set forth.

In testimony whereof I have signed my name to this specification.

GERALD DOD.